(No Model.) 2 Sheets—Sheet 1.
E. H. ASHCROFT.
AUTOMATIC RELIEF DEVICE FOR STEAM DISTRIBUTING PIPES.
No. 299,192. Patented May 27, 1884.
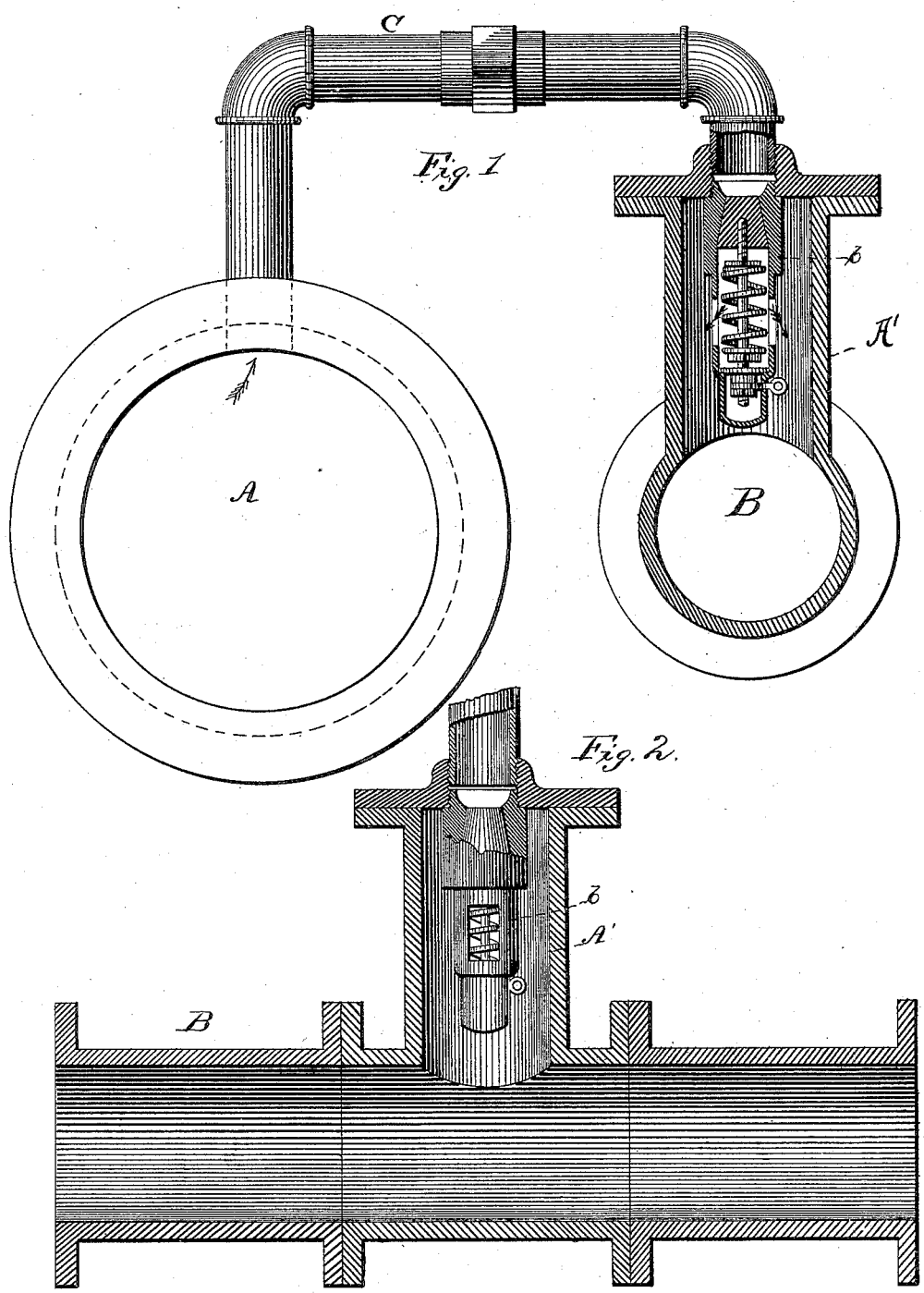

(No Model.) 2 Sheets—Sheet 2.
E. H. ASHCROFT.
AUTOMATIC RELIEF DEVICE FOR STEAM DISTRIBUTING PIPES.
No. 299,192. Fig 3 Patented May 27, 1884.
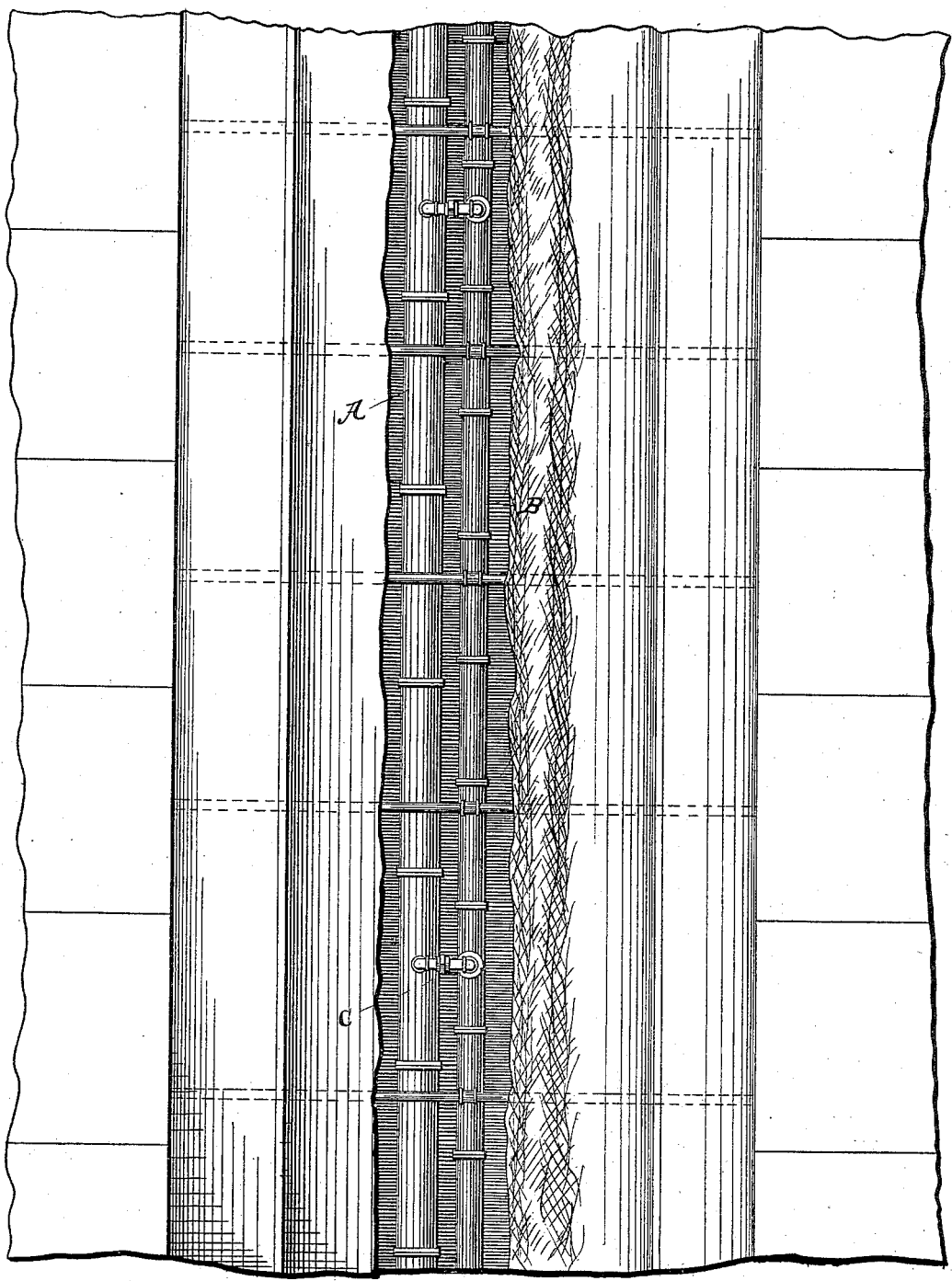
WITNESSES
Chas. R. Burr
W. E. Bowen
INVENTOR
E. H. Ashcroft
per O. E. Duffy
Attorney

UNITED STATES PATENT OFFICE.

EDWARD H. ASHCROFT, OF LYNN, MASSACHUSETTS.

AUTOMATIC RELIEF DEVICE FOR STEAM-DISTRIBUTING PIPES.

SPECIFICATION forming part of Letters Patent No. 299,192, dated May 27, 1884.

Application filed January 27, 1883. (No model.)

*To all whom it may concern:*

Be it known that I, EDWARD H. ASHCROFT, of Lynn, in the county of Essex and State of Massachusetts, have invented certain new and useful Improvements in Methods of and Devices for Automatically Relieving Pressure in Steam-Distributing Pipes; and I do hereby declare that the following is a full, clear, and exact description thereof, which will enable others skilled in the art to which it appertains to make and use the same, reference being had to the accompanying drawings, and to the letters of reference marked thereon, which form part of this specification.

This invention has for its object to prevent underground steam-distributing pipes from bursting from internal pressure. A further object of the invention is to run underground pipes carrying steam of different pressures side by side, laid a suitable distance apart, and to connect them by suitable means, whereby the high-pressure pipe is relieved of its surplus steam, which may be utilized in the pipe of lower pressure, thus producing economic results in steam-distribution and safety to the pipes, and in other details of invention, as will be hereinafter described, and pointed out in the claims.

To these ends my invention consists, first, in laying steam-pipes carrying different pressures side by side, and connecting them by suitable means, for controlling communication with each other at intervals throughout their length; second, in the method herein described of utilizing the surplus steam of underground distributing-pipes by conveying the same to pipes of lower pressure for house-heating, whereby the excessive pressure of the former is conveyed to the latter and utilized as a heating medium when the engines are stopped and for the relief of high-pressure steam-pipe, as described.

In the drawings, Figure 1 is an end view, partly in section, of two lines of pipe, showing them connected by a smaller or intermediate pipe controlled by a valve. Fig. 2 is a side elevation of lengths of pipe, illustrating the valve as inclosed within an incasement or branch of the smaller pipe. Fig. 3 is a plan view of the lines of pipe, thoroughly illustrating the mode of laying them through streets underground.

A designates the pipe, of suitable diameter for conveying steam of high pressure for steam-engines and for use in the arts, and B represents a line of pipe for conducting steam of a lower pressure for heating purposes. These two lines of pipe are designed to be laid side by side underground, say, to the depth of three feet, more or less, and from six to eight or ten inches apart, as the case may be, to be determined by the thickness of covering around the pipes. The two lines are connected to and run from some source of supply, as a boiler-house, where the steam is generated, and the lines of pipe are supplied with steam of different pressures, for the purposes of utilization for the purposes before mentioned. To prevent the bursting or cracking of the high-pressure conveying pipe, which sometimes is occasioned from undue pressure, sudden condensation, and other causes which exert a powerful force on the pipe, with considerable damage, the two pipes A and B are connected at intervals along the line by an intermediate length of pipe, C, which may be in one piece, but is preferably in sections, suitably joined one to the other, and one end of this short pipe is connected to and communicates with the pipe A. The other end of the pipe C connects by any strong steam-pipe joint with an upright branch, A', of the pipe B, within which branch is inclosed and works a suitable safety-valve, b, said valve adapted to be adjusted at certain pressures. No steam will escape from the large pipe A into the small pipe B, unless the pressure exceeds the limit of pressure at which the valve may be adjusted or set to open. The small pipe B, into which the surplus steam is discharged, should have its exit in the boiler-house, where the generation of the steam takes place.

The operation of my invention is as follows: The amount of pressure to the square inch that pipes used for these purposes are able to withstand is generally known before they are laid, but from many causes—such as over-pressure—the pipes very often burst, and serious damage is the consequence. Now, to prevent such accidents by the use of the means as hereinbefore described, when the pressure in the large pipe becomes too great, it will be relieved by the opening of the valve and the escape of surplus steam into the pipe of lower steam-pressure.

The nature and object of my invention will be readily apparent.

I am aware of the existence of a patent for apparatus for supplying steam to cities, in which steam at high pressure from a boiler-house is applied to a high-pressure main, whence it enters a distributer and is conveyed to places for consumption as a power in running engines, &c. In said existing patent, after the steam is utilized in the engine, it is exhausted through service-pipes into a lower-pressure main, and supplied to houses, &c., for heating, the high and low pressure mains being connected at a point near the boiler-house by a regulator, the purpose of which is to always maintain the steam in the lower-pressure main at a certain pressure, said regulator being brought into action when the exhaust-steam falls below such pressure. Mine, it will be seen, is for an entirely distinct invention.

What I claim is—

1. The method of distributing steam in underground mains, which consists in conveying steam of high and low pressure in separate and adjoining conduits, and permitting the excess of steam to automatically escape from the high to the low pressure conduit at various points along the line, substantially as described.

2. The combination, in an apparatus for the distribution of steam, of the main A with the auxiliary main B, having branch A', and a valve located within said branch, said mains being connected by the intermediate pipe and permitted to communicate by the automatic action of the valve, substantially as and for the purpose set forth.

3. A steam-distributing main, A, connected with an auxiliary main, B, which is provided at intervals throughout its length with safety or blow-off valves, whereby the pressure in A is relieved by the escape of steam to B, substantially in the manner and for the purpose described.

4. The combination, with a steam-distributing main, of an auxiliary main connected thereto at intervals by steam-connections containing safety valves for permitting the escape of steam from the main to the auxiliary main, substantially in the manner and for the purpose set forth.

5. The combination of main pipe A, relief-pipe B, having branch A', which is provided with valve b, and the connecting-pipe C, as set forth.

In testimony that I claim the foregoing as my own I affix my signature in presence of two witnesses.

EDWARD H. ASHCROFT.

Witnesses:
EZRA BAKER,
CHAS. N. STEVENS.